United States Patent
Hintzen

(12)
(10) Patent No.: US 6,331,698 B1
(45) Date of Patent: Dec. 18, 2001

(54) THERMOWELDABLE CLIP FOR CONDUITS

(75) Inventor: Werner Hintzen, Köln (DE)

(73) Assignee: Manibs Spezialarmaturen GmbH & Co. KG, Remscheid (DE)

( * ) Notice: Subject to any disclaimer, the term of this patent is extended or adjusted under 35 U.S.C. 154(b) by 0 days.

(21) Appl. No.: 09/581,668

(22) PCT Filed: Dec. 14, 1998

(86) PCT No.: PCT/EP98/08195

§ 371 Date: Jun. 15, 2000

§ 102(e) Date: Jun. 15, 2000

(87) PCT Pub. No.: WO99/32824

PCT Pub. Date: Jul. 1, 1999

(30) Foreign Application Priority Data

Dec. 20, 1997 (DE) .......................................... 297 22 603 U

(51) Int. Cl.⁷ .............................. F16L 47/02; B29C 65/34
(52) U.S. Cl. ........................ 219/535; 219/544; 156/304.2
(58) Field of Search ..................................... 219/535, 544; 156/304.2, 379.7, 499; 285/41, 21.1, 21.2

(56) References Cited

U.S. PATENT DOCUMENTS 4,436,987 * 3/1984 Thalmann et al. ................... 219/535

FOREIGN PATENT DOCUMENTS

| 652473 | 11/1985 | (CH) . |
| 195 19 341 C1 | 6/1996 | (DE) . |
| 296 16 864 U1 | 1/1997 | (DE) . |
| 196 44 055 A1 | 12/1997 | (DE) . |

* cited by examiner

*Primary Examiner*—John A. Jeffery
(74) *Attorney, Agent, or Firm*—Friedrich Kueffner

(57) ABSTRACT

A thermoweldable clip for a weldable conduit has two shells surrounding the conduit when in use. The shells have facing longitudinal flanges and are connected to one another under pressure. The shells have electrically heatable conductors arranged in continuous windings at inner shell surfaces. The windings extend in a semi-circular zone at the inner surfaces in two end areas of the shell and also between these two semi-circular zones in a planar strip. The shape and the arrangement of the conductors are identical. The shells are positioned so as to face one another. The strip is arranged only at the inner surface of one of the longitudinal flanges. Electrical terminals are formed integrally on the outer shell sides. The conductors project from the contact surface of the semi-circular zones or the strip on the longitudinal flange. A positive locking connection is provided between the conductors and the shell material.

5 Claims, 2 Drawing Sheets

THERMOWELDABLE CLIP FOR CONDUITS

BACKGROUND OF THE INVENTION

1. Field of the Invention

The invention relates to a clip of thermoweldable material for a conduit also comprised of weldable material, such as a repair clip, comprised of at least two shells surrounding the conduit in the position of use, of which optionally at least one has a branch pipe, and wherein the shells have longitudinal flanges facing one another in pairs in the position of use, which can be connected to one another under pressure, wherein the shells have at least one electrically heatable conductor arranged in continuous windings at its inner surfaces, and wherein the windings of the conductor extend, on the one hand, only in a semi-circular zone at the inner surfaces in the two end areas of the shell, respectively, and, on the other hand, extend also between these two semi-circular zones in a planar strip. Such clips are used, for example, for repair purposes or to retrofit an already mounted conduit, that is pressurized by a medium, with a branch conduit. In the latter situation, clips are used which have a branch pipe at least at one of the cylinder-shaped shells placed about the conduit. This branch pipe first serves to drill into the conduit, but then also to guide the medium into the branch conduit connected to the branch pipe. In the first situation, where a conduit has a defective location, the clip comprised of shells without a branch pipe is placed onto the conduit for repair purposes.

2. Description of Related Art

A known clip of this kind (DE 295 12 309 U1) has windings of a conductor provided on the inner surfaces of the two shells wherein only those circular zones in which the branch pipe is provided are free out such windings. The conductor is a wire whose windings are comprised of parallel linear winding legs and winding arches connecting them in pairs. The great length of the conductor requires great electrical energy expenditure for melting the contact surfaces. In the large contact area to be welded disturbances can occur at many locations, and this can result in leaks. The two shells of this known clip are of different design relative to one another, and there are wall areas which overlap. This requires different mold parts for manufacturing the two shells and a correspondingly complex storage and processing.

The disadvantage of a different design of the shells for forming the clip also pertains to the solution according to DE 195 19 341 C1. This is so because in this known solution the different design of the shells results from the longitudinal flanges of only one shell having a respective heating coil.

Shells of identical design are disclosed in the prior art CH 652 473 A in which, however, the heating coil is in the form of a separate component not connected to any of the shells. For the purpose of arranging the heating coil between the shells and the conduit, the inner surfaces of the shells must be spaced from the surface of the conduit by a spacing corresponding to the heating coil. Moreover, for filling this intermediate space with material, the heating wire of the heating coil is embedded in plastic material which, as a result of melting, fills the intermediate space and provides a connection between the conduit and the shell.

SUMMARY OF THE INVENTION

It is an object of the invention to develop a reliable clip which can be assembled of two identical parts and ensures with minimal material and energy expenditure a medium-tight connection between the clip and the conduit. This is achieved according to the invention in that the shells with respect to their shape and the arrangement of the conductor are the same or identical, and for a paired use of the shells in the clip are positioned so as to face one another, wherein the band is arranged only at the inner surface of one of the longitudinal flanges, and electrical terminals are provided which are formed integrally on the outer side of each shell, wherein the conductor projects with a part of its cross-section from the contact surface of the semi-circular zones on the shell or the strip on the longitudinal flange, and a positive locking connection is provided between the conductor and the material of the shell.

Firstly, the invention has recognized that it is sufficient to provide in the two end areas of the shells relatively small semi-circular zones with windings when, in addition, the conductor is arranged only at the inner surface of one longitudinal flange in the form of a planar strip that connects the two semi-circular zones with one another. The central area of the shells thus remains free of a heating conductor. The energy expenditure for welding can be significantly reduced when the conductor projects with a portion of its cross-section from the contact surface of the semi-circular zones on the shell, respectively, the strip on the longitudinal flange. The minimal areas of the clip where welding is to take place can be heated with relatively minimal heating energy. Since both shells are of identical design, they can be combined in pairs with one another in a rotated position. This results in an all around axial and radial connection of the two shells relative to one another.

It is especially advantageous for the mentioned arrangement of the conductor to pre-shape it in a meandering shape so that a heating element is obtained which extends in windings on the mentioned areas of the inner surface of the shell and the longitudinal flange. The meandering shape arranged in windings can be positioned with its broad side at the contact surface so that its conductor projects reliably with a portion of its cross-section from the contact surface.

BRIEF DESCRIPTION OF THE DRAWINGS

Further features and advantages of the invention can be taken from the following description, and the drawings. In the drawing one embodiment of the invention is represented. It is shown in.

DESCRIPTION OF PREFERRED EMBODIMENTS

Figure 1:
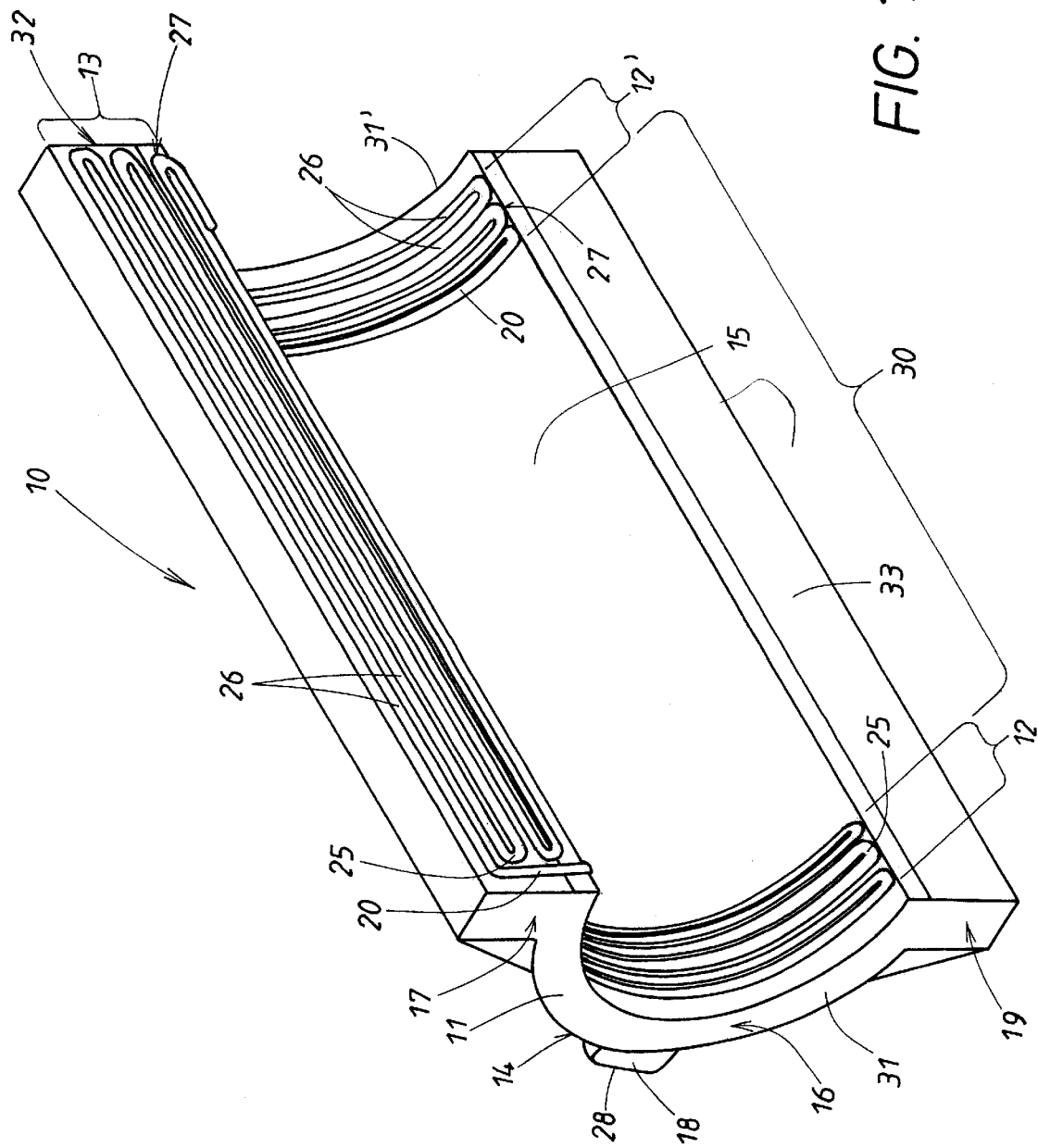
FIG. 1 a perspective representation of an interior view of a shell of the clip according to the invention.
Figure 2:
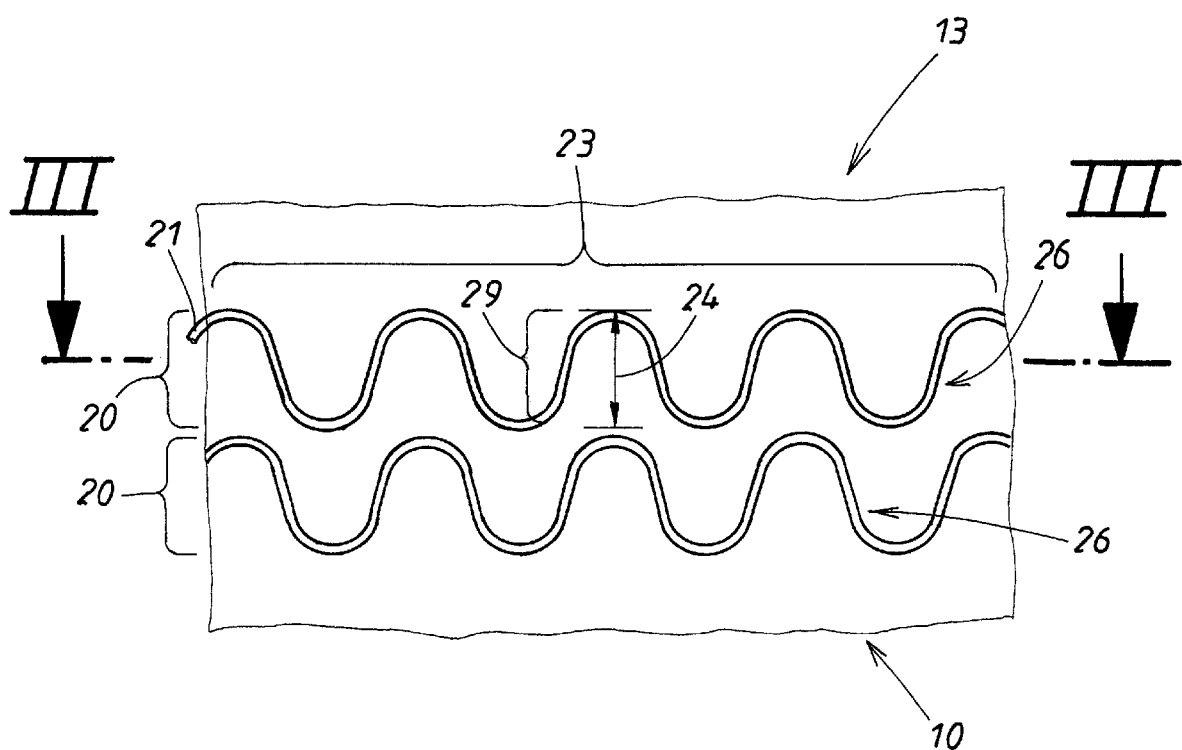
FIG. 2 in an enlarged representation a portion of the contact surface to be welded of the shells of FIG. 1.

The invention is directed to a clip comprised of two shells 10 which are comprised of thermoweldable material 11. Aside from a possibly provided branch pipe, both shells 10 are of identical configuration so that it is sufficient to describe only the shell according to FIG. 1 in more detail.

The shell 10 comprises, in addition to the shell body of thermoplastic material 11 which can be constructed in portions thereof of several layers, also a special heating element 20 which is produced of a pre-product in the form of an electrical conductor 21, i.e., a metallic wire. The conductor 21 is comprised of a wire with circular cross-section 22. The heating wire 21 is first brought into a planar meandering shape having a planar strip with a width 24 according to the width of the meandering shape. When in the following reference is made to the "heating element", the aforementioned meandering shape 23 comprised of the conductor 21 is meant.

This heating element 20 is arranged at defined locations 12, 12', 13 in windings 25 whose meandering shape is not shown in detail in FIG. 1. The windings are comprised essentially of linear winding legs 26 whose ends are connected in pairs by winding arches 27. This course of the windings is preferably predetermined in a so-called "heating mat" that is to be prefabricated. The windings 25 can be position-secured relative to one another in this heating mat by means of a plastic layer. The conductor 21 extends through this heating mat in a continuous meandering arrangement and the two ends of the conductor may extend straight in order to be connected to terminals in the following way.

Such a prefabricated heating mat or a heating element 20 to be arranged in windings 25, to be explained in more detail in the following, is placed into an injection mold which is used for producing the shell 10. Accordingly, the heating mat or the heating element 20 is placed onto the future contact surface of the shell 10 at the aforementioned locations 12, 12', 13 whose position will be explained in the following in more detail. The two ends of the conductor 21 are connected to electrical terminals 28 which will be positioned at the future outer side 14 of the injection-molded shell. Subsequently, the material 11 is introduced into the injection mold, which optionally binds with the plastic material of the previously introduced heating mat, and the plastic-metal product 10 of FIG. 1 will result. This plastic-metal product comprises a half tube part 16 having longitudinal edges with two longitudinal flanges 17, 19 formed thereat. For the purpose of electrical insulation of the aforementioned terminals 28 connected to the ends of the conductor, a contact sleeve 18 is formed at the outer side 14 of the shell 10 where later on electrical counter contacts of a current source of the welding device will be connected for the welding process.

As illustrated in FIG. 1, the windings 25 according to the invention are arranged only in narrow zones 12 and 12' in the two end areas 31 and 31' of the half tube part 16 of the shell 10. At these locations semi-circular zones 12, 12' are respectively provided at the inner surface 15 of the clip. In the intermediately arranged inner surfaces zone 30 of the shell 10 there are no electrical conductors provided. For this reason, it is easily possible to provide a branch pipe within the aforementioned half tube part 16 of the shell 10.

The heating element 20 extends in the two semi-circular zones 12, 12' with its winding legs 26 positioned in parallel radial planes, as can be seen in FIG. 1. The winding arches 27 are thus positioned in the edge transitions between the inner surface 15 of the shell and the inner surfaces 32, 33 of the two longitudinal flanges 17, 19. It would also be possible to provide in these zones annular parts which partially overlap these inner surfaces 32, 33. This requires complementary annular part receptacles in the respective counter shells which are positive-lockingly engaged by the annular parts in the position of use.

The heating element 20 extends in the bridging area between the two semi-circular zones 12, 12' only on one inner surface 32 of one longitudinal flange 17 while the inner surface 33 of the oppositely arranged longitudinal flange 19 is free. The heating element 20 is embodied at this inner surface 32 in the form of a planar strip 13. In this case the winding legs 26 are arranged axis-parallel and the winding arches 27 connecting them in pairs are facing the two end faces 31, 31' of the clip 10.

As mentioned before, two substantially identical shells 10 are used for assembling a clip according to the invention. These two shells are placed in an orientation in which they face one another about the conduit, not shown, that is to be provided with a clip. In the position of use the two shells are pressed against one another; this can be achieved by screw means, such as bolts and nuts, provided between the two longitudinal flanges 17, 19 of the two shells arranged in pairs and facing one another. Subsequently, an electrical current is supplied to the windings of the heating element 20 by means of the welding device connected at 28. Because of the resulting heating of the conductor, the plastic material becomes liquid in the semi-circular zones 12, 12' resulting in melding of the plastic material 11 of the shell 10 with the conduit which is also made of weldable material. Also, in analogy, this happens to the plastic material of the two complementary inner surfaces 32 and 33 of the longitudinal flanges 17, 19 of the two shells 10 rotated to face one another and being pressed against one another. After solidification of the molten material, a flawless connection is obtained wherein minimal energy amounts are sufficient in the zones 12, 12', and 13.

Figure 3:
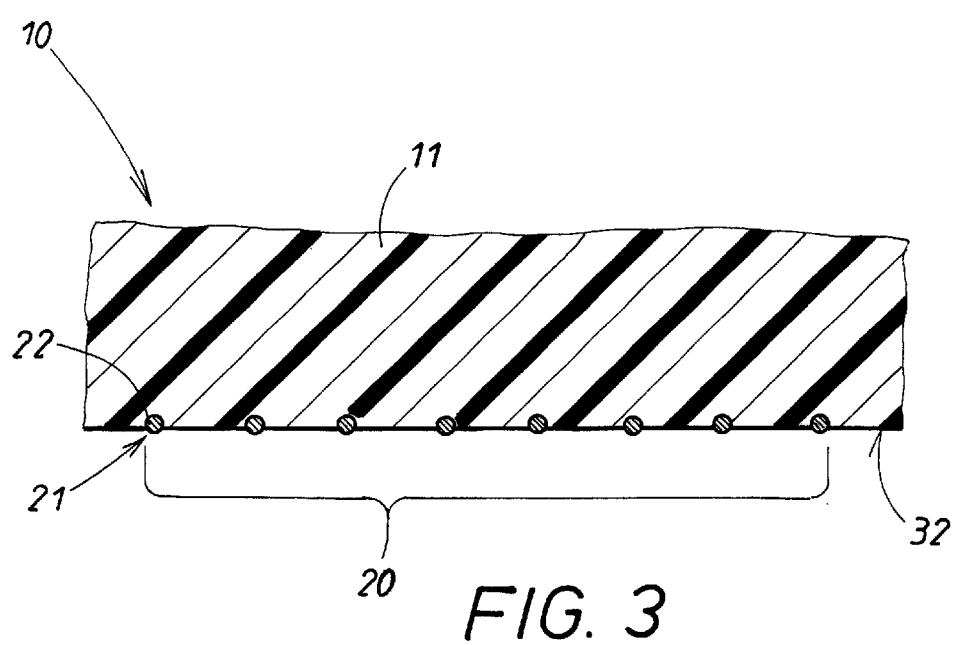
FIG. 3 schematically a. cross-section of a contact surface to be welded of the clip of FIG. 1 in a section along section line III—III of FIG. 2.

As illustrated by the detail view of the surface area at 12, 12', and 13, the meandering heating element 20 is positioned so tightly relative to the neighboring winding legs 26 that the meander arches are very closely positioned to one another and optionally can extend into the meander gaps of the neighboring heating element 20. The arrangement, in any case, is selected such that one broad side 29 of the meander 23 contacts at least the future contact surface 32 at 13 and 15 at 12, 12', as illustrated in FIG. 3. The heating wire 21, as taught in FIG. 3, penetrates with a portion of its cross-section 22 from this contact surface 32. The meandering arrangement 23 of the heating element 20 allows such a relief-like angement of the conductor 21 at the surface because, by doing so, a sufficient positive-locking connection between the wire 21 the plastic material 11 is realized.

What is claimed is:

1. Clip of thermoweldable material (11) for a conduit also comprised of weldable material, comprised of at least two shells (10) surrounding the conduit in the position of use, and wherein the shells (10) have longitudinal flanges (17, 19) facing one another in pairs in the position of use, which can be connected to one another under pressure, wherein the shells (10) have at least one electrically heatable conductor (21) arranged in continuous windings (25) at inner surfaces (15) of the shells (10), and wherein the windings (25) of the conductor (20) extend, on the one hand, only in a semi-circular zone (12, 121) at the inner surfaces (15) in two end areas (31, 31') of the shell (10), respectively, and, on the other hand, extend also between these two semi-circular zones (12, 12') in a planar strip (13), wherein the shells (10) with respect to their shape and the arrangement of the conductor (21) are the same or identical, and for a paired use of the shells (10) in the clip are positioned so as to face one another and rotated relative to one another, wherein the strip (13) is arranged only at the inner surface (32) of one of the longitudinal flanges (17), and electrical terminals (18, 28) are provided which are formed integrally on the outer side (14) of each shell (10), wherein the conductor (21) projects with a part of its cross-section (22) from the contact surface (15, 32) of the semi-circular zones (12, 12') on the shell or the strip (13) on the longitudinal flange, and a positive locking connection is provided between the conductor (21) and the material of the shell (10).

2. Clip according to claim 1, wherein the conductor (21) is pre-shaped in a planar meandering shape (23) and forms a meandering heating element (20), which extends in windings (25) within the semi-circular zones (12, 12') on the shells as well as within the strip (13) on the longitudinal flange, wherein the meandering shape (23) is arranged with one of its broad sides (29) in the contact surfaces (15, 52).

3. Clip according to claim 1, wherein the meandering heating element (20) is positioned in windings (25) and is then integrated into a pre-product of plastic material, wherein this pre-product is arranged on the inner surface (15) of the shell and on the inner surface (32) of one of the longitudinal flanges (17) and is inseparably connected with the plastic material (11) of the shell during manufacture of the shell (10).

4. Clip according to claim 2, wherein the windings (25) of the heating element (20) are comprised of substantially linear winding legs (26) and of winding arches (27) connecting neighboring winding legs (26), wherein the winding legs (26) extend on the semi-circular zone (12, 12') in parallel radial planes, while the winding legs (26) on the longitudinal flange (17) are arranged in a common axial plane.

5. Clip according to claim 1, wherein at least one of the least two shells (10) surrounding the conduit in the position of use has at least one branch pipe.

* * * * *